United States Patent
Sonoura et al.

(10) Patent No.: US 10,410,172 B2
(45) Date of Patent: Sep. 10, 2019

(54) OBJECT DETECTION APPARATUS, DEPALLETIZATION AUTOMATING APPARATUS, AND OBJECT DETECTION METHOD

(71) Applicant: Kabushiki Kaisha Toshiba, Minato-ku (JP)

(72) Inventors: Takafumi Sonoura, Yokohama (JP); Akihito Ogawa, Fujisawa (JP); Hideichi Nakamoto, Tokyo (JP); Haruna Eto, Kawasaki (JP); Rie Katsuki, Kawasaki (JP); Junya Tanaka, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 116 days.

(21) Appl. No.: 15/262,126

(22) Filed: Sep. 12, 2016

(65) Prior Publication Data

US 2017/0076469 A1     Mar. 16, 2017

(30) Foreign Application Priority Data

Sep. 14, 2015   (JP) ................................. 2015-180344

(51) Int. Cl.
  *G06T 7/68* (2017.01)
  *G06Q 10/08* (2012.01)
  *G06K 9/46* (2006.01)
  *G06T 7/73* (2017.01)
  *G06K 9/32* (2006.01)

(52) U.S. Cl.
  CPC ......... *G06Q 10/087* (2013.01); *G06K 9/4604* (2013.01); *G06T 7/68* (2017.01);
  (Continued)

(58) Field of Classification Search
  CPC .. G06Q 10/087; G06Q 10/08; G06Q 10/0833; G06Q 10/083; G06Q 50/28;
  (Continued)

(56) References Cited

U.S. PATENT DOCUMENTS

| | | | | |
|---|---|---|---|---|
| 4,654,949 A | * | 4/1987 | Pryor ................... | A01B 69/008 29/407.04 |
| 8,561,897 B2 | * | 10/2013 | Kunzig ................ | G06Q 10/087 235/385 |

(Continued)

FOREIGN PATENT DOCUMENTS

| | | |
|---|---|---|
| JP | 2004-12143 | 1/2004 |
| JP | 2004-94594 | 3/2004 |

(Continued)

*Primary Examiner* — Andrew M Moyer
*Assistant Examiner* — Dennis Rosario
(74) *Attorney, Agent, or Firm* — Oblon, McClelland, Maier & Neustadt, L.L.P.

(57) ABSTRACT

According to an embodiment, an object detection apparatus includes an imaging unit, an extraction unit, an estimation unit, and a detection unit. The imaging unit acquires an image of a plurality of polyhedrons which are loaded, each of the polyhedrons having a marker on a surface, each of marker including a first straight line portion and a second straight line portion. The extraction unit that extracts a plurality of markers included in the image. The estimation unit estimates a region included in the surface by using the first straight line portion and the second straight line portion of the extracted markers. The detection unit detects a region having all corners provided with the markers as a surface of a desired polyhedron.

13 Claims, 19 Drawing Sheets

(52) U.S. Cl.
CPC ........ *G06T 7/74* (2017.01); *G06K 2009/3225* (2013.01); *G06T 2207/30204* (2013.01)

(58) Field of Classification Search
CPC .................. B65D 2203/10; G06T 7/13; G06T 2207/30176; G06T 7/12; G06T 7/73; G06T 2207/20164; G06T 7/11; G06T 17/00; G06K 9/00463; G06K 9/4604; G06K 9/3233; G06K 9/00664
See application file for complete search history.

(56) References Cited

U.S. PATENT DOCUMENTS

| | | | |
|---|---|---|---|
| 9,016,580 B2 * | 4/2015 | Tsai | G06K 7/1443 235/375 |
| 9,708,122 B1 * | 7/2017 | Johncox | B65G 1/026 |
| 9,827,683 B1 * | 11/2017 | Hance | B25J 9/162 |
| 9,881,349 B1 * | 1/2018 | Meier | G06T 1/0014 |
| 2002/0024598 A1 * | 2/2002 | Kunimitsu | B66C 13/46 348/159 |
| 2007/0126578 A1 * | 6/2007 | Broussard | G06K 17/0022 340/572.1 |
| 2011/0235054 A1 | 9/2011 | Koike et al. | |
| 2012/0191272 A1 * | 7/2012 | Andersen | G06Q 10/087 701/2 |
| 2015/0344225 A1 | 12/2015 | Nakamura et al. | |

FOREIGN PATENT DOCUMENTS

| | | |
|---|---|---|
| JP | 4301889 B2 | 7/2009 |
| JP | 2011-209064 | 10/2011 |
| JP | 4904426 B1 | 3/2012 |
| JP | 2015-224125 | 12/2015 |

\* cited by examiner

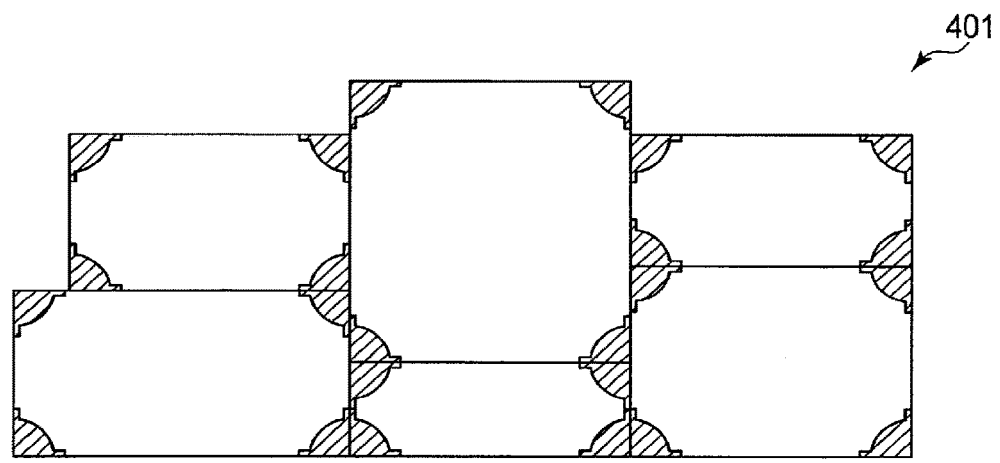
F I G. 4A
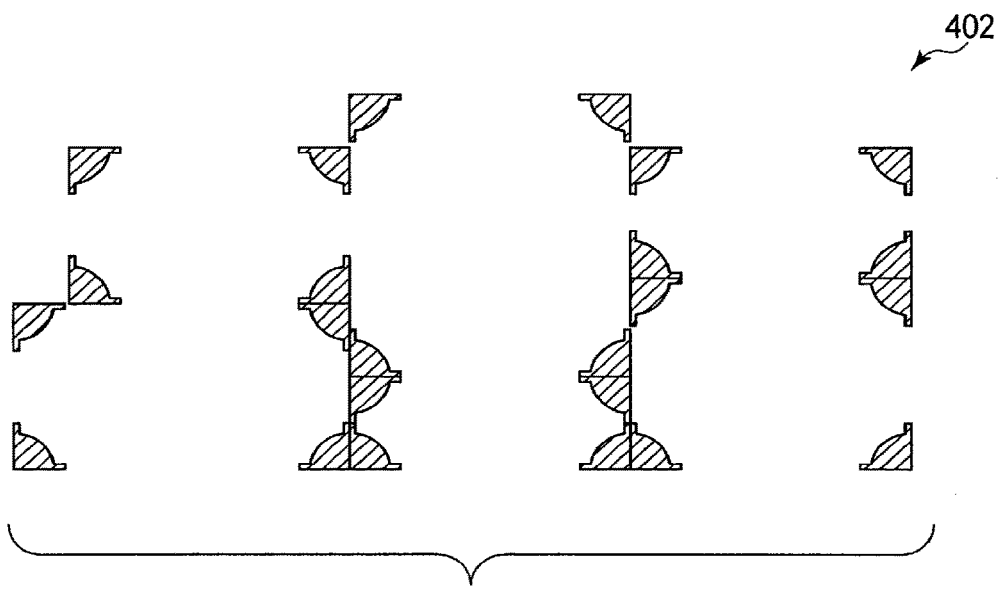
F I G. 4B

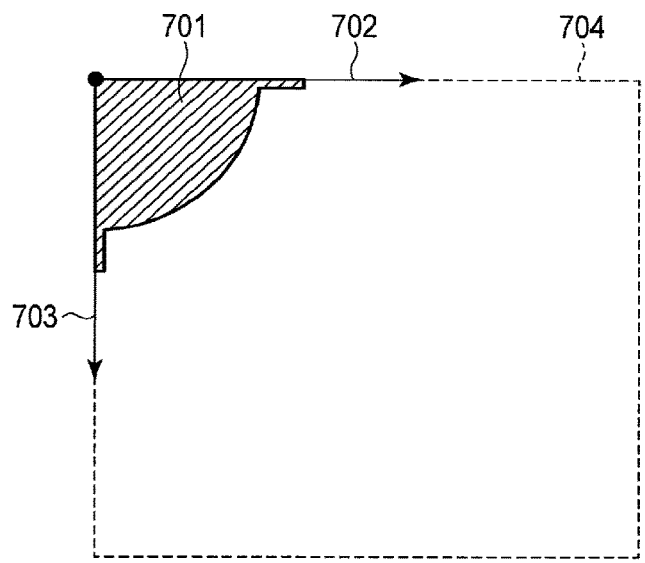
F I G. 7
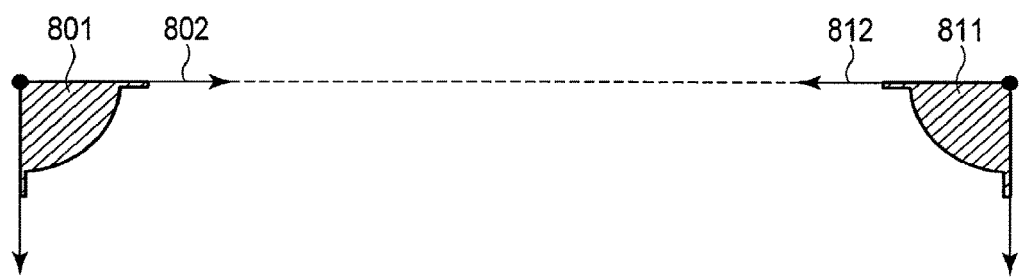
F I G. 8
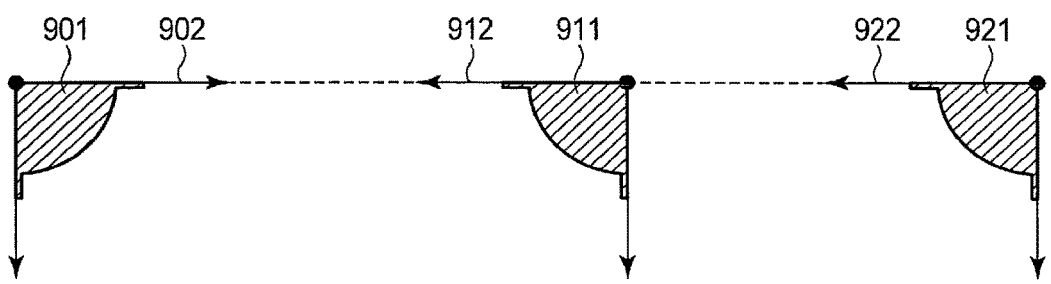
F I G. 9

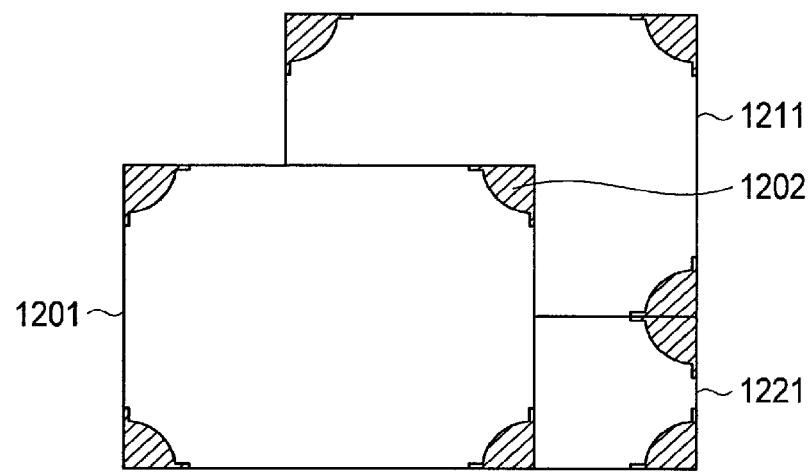
F I G. 12
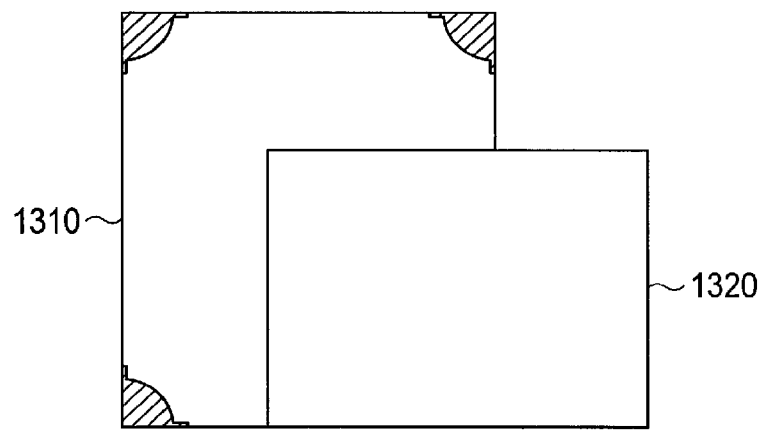
F I G. 13

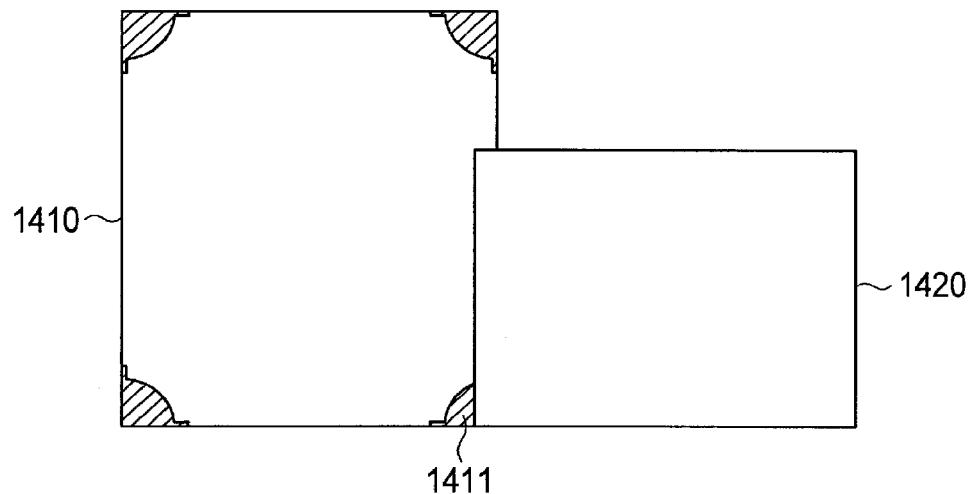
F I G. 14A
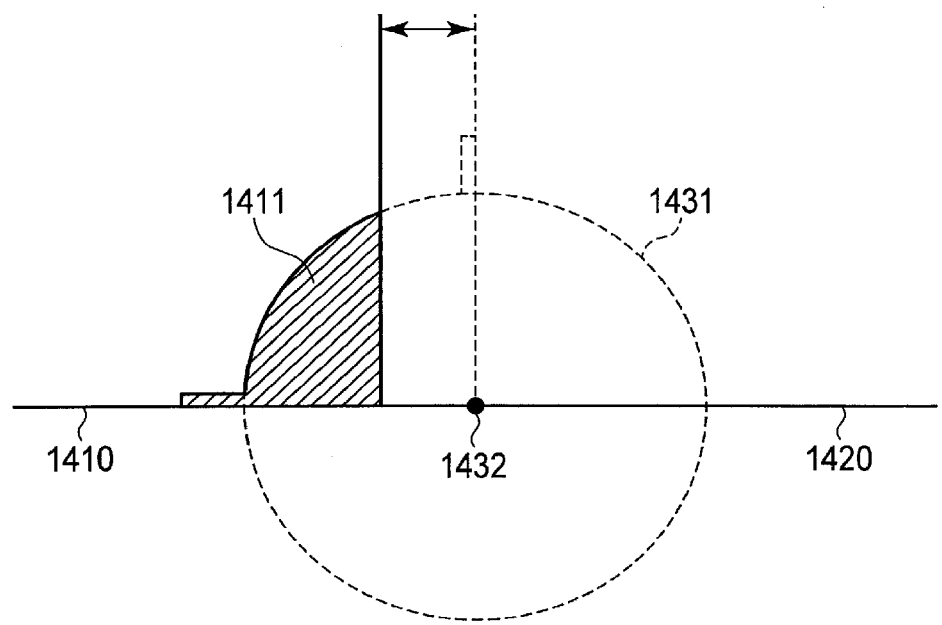
F I G. 14B

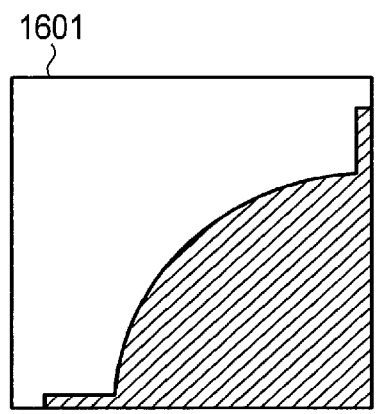
F I G. 16A
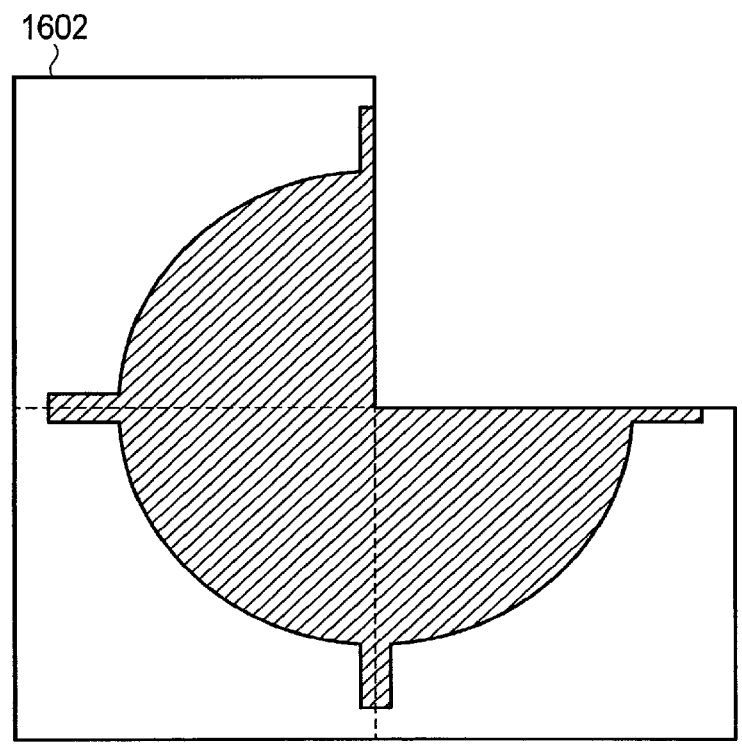
F I G. 16B

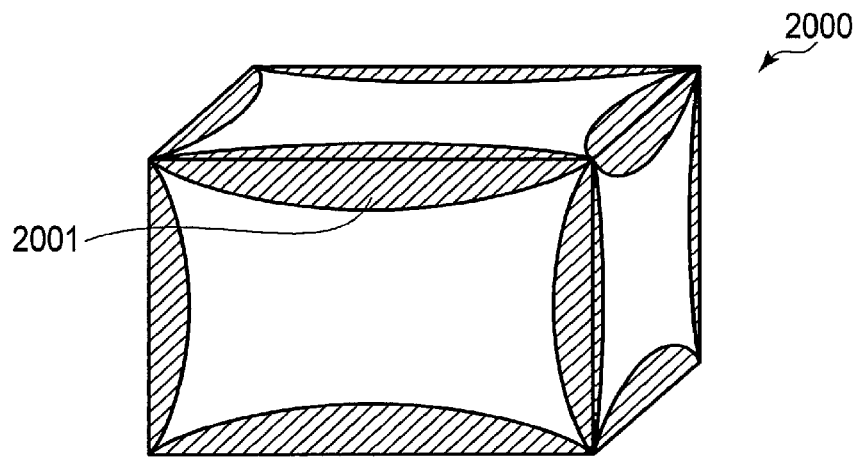
F I G. 20A
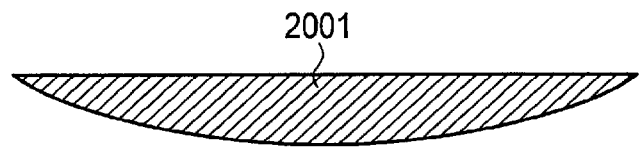
F I G. 20B
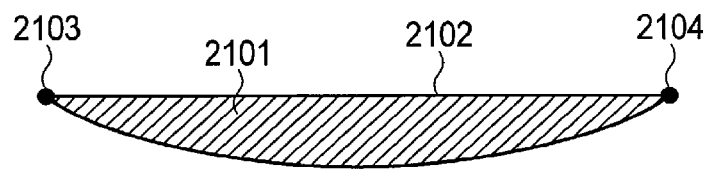
F I G. 21

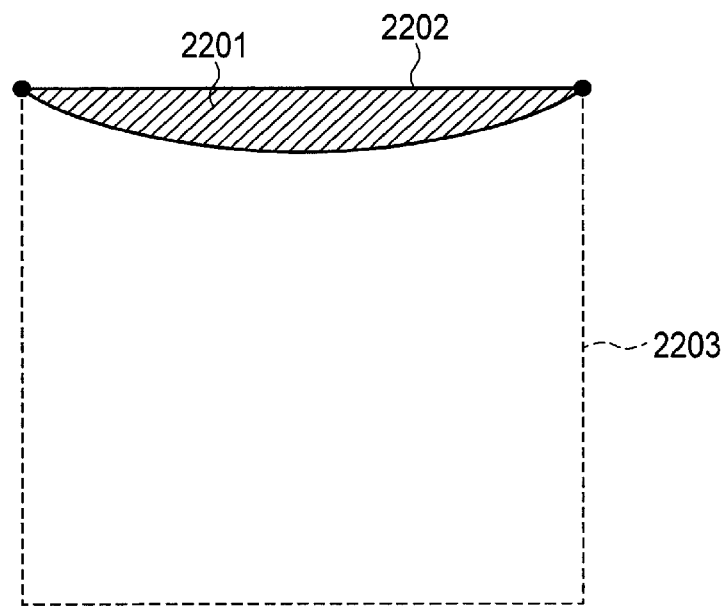
F I G. 22A
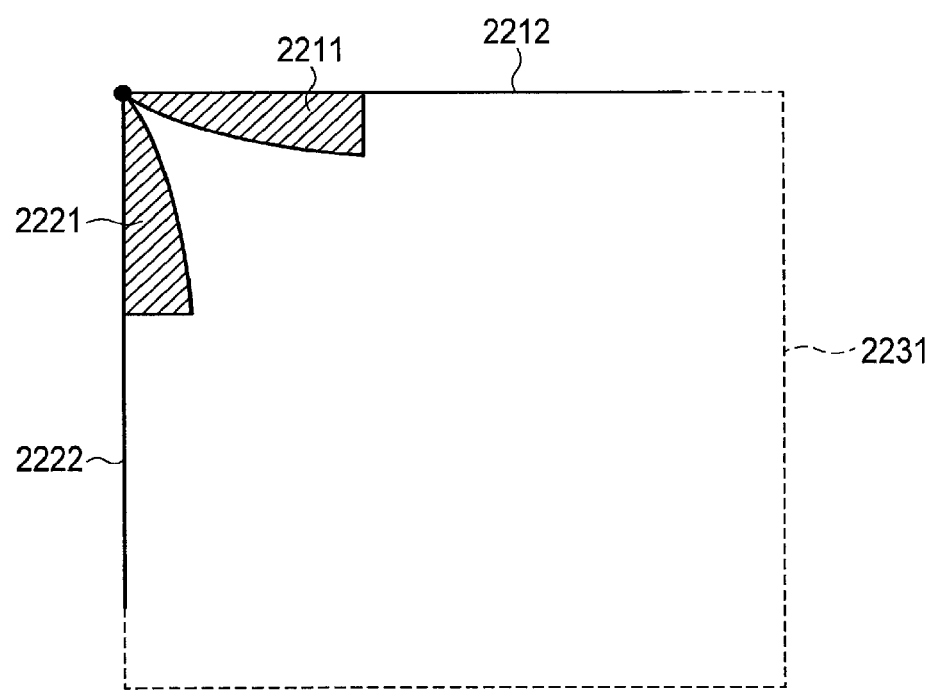
F I G. 22B

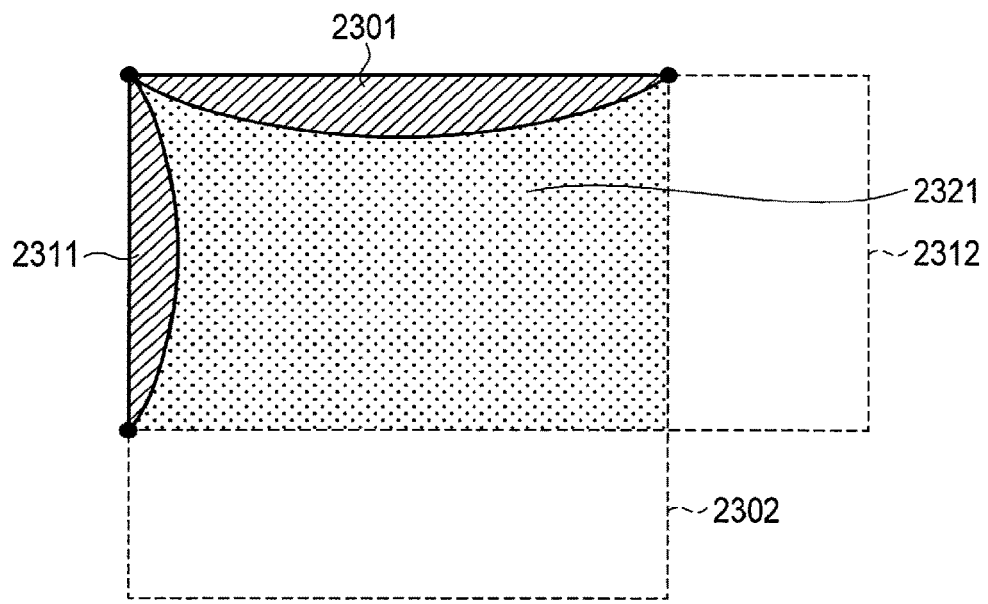
F I G. 23
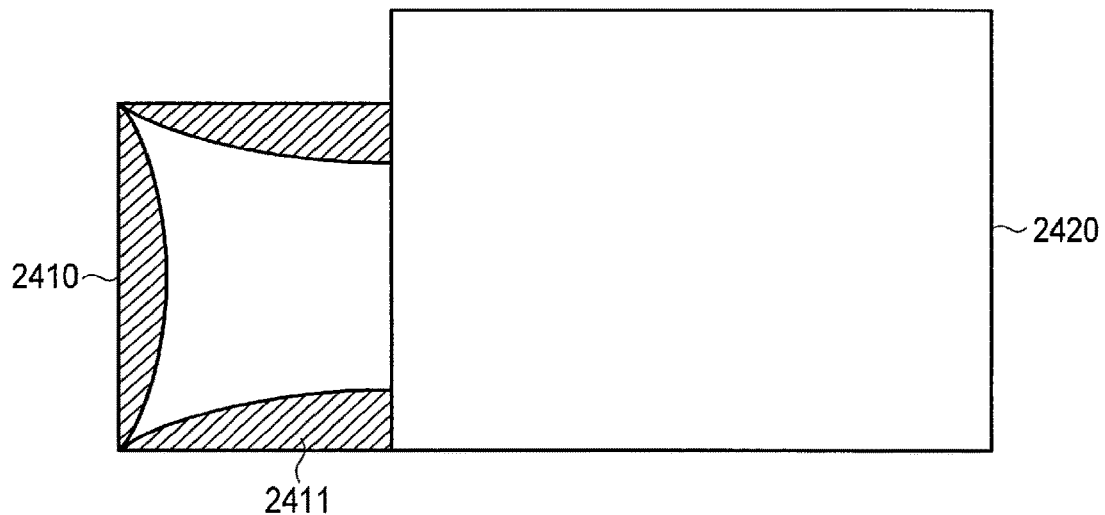
F I G. 24A

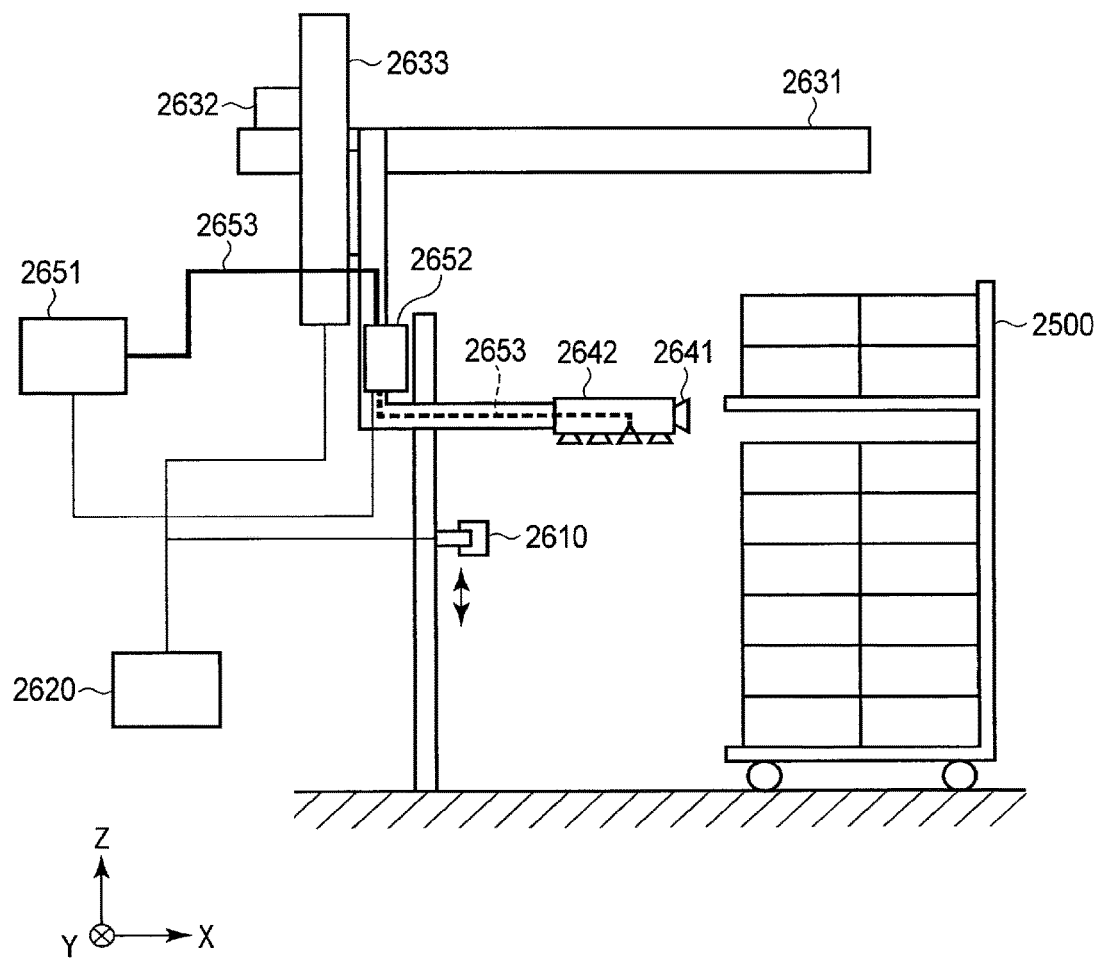
F I G. 26

OBJECT DETECTION APPARATUS, DEPALLETIZATION AUTOMATING APPARATUS, AND OBJECT DETECTION METHOD

CROSS-REFERENCE TO RELATED APPLICATION

This application is based upon and claims the benefit of priority from Japanese Patent Application No. 2015-180344, filed Sep. 14, 2015, the entire contents of which are incorporated herein by reference.

FIELD

Embodiments described herein relate generally to an object detection apparatus, a depalletization automating apparatus, and an object detection method.

BACKGROUND

In recent years, in the field of distribution, owing to an increase in the number of handled packages and a decrease in workforce, there has been an increasing need for automation of work. Up to the present, the work of conveyance and sorting of packages has been automated by using a conveyer and a sorter. In addition, automation is progressing as regards the unloading work for putting packages, which are loaded on a pallet box, onto the conveyor. However, when packages with irregular shapes are mixedly present, it is difficult to detect individual packages, leading to a hindrance to automation.

In usual cases, image processing or the like may be used as a package detection method. For example, there is known a package detection apparatus which uses a strobe, and a camera which can be synchronized with the strobe. By photographing edge portions of a package with emphasis, it becomes easier to extract the contour of the package, and individual packages are detected based on the detected contours. However, this detection apparatus has such a problem that it is difficult to extract a gap between packages which are put in close contact with each other, with their surfaces being regularly arranged, or it is difficult to detect a plurality of packages, which are put together, as a single pack.

Besides, as regards this detection apparatus, in some cases, when packages are put in contact in a front-and-rear direction, it is not possible to determine a hidden state of a package, for example, to determine which of the packages extends rearwards, and it is not possible to plan a proper holding strategy for holding the packages. Furthermore, in some cases, this detection apparatus may erroneously detect a pattern which is printed on a package, or a label such as a slip, which is attached to a package, as a contour of the package.

BRIEF DESCRIPTION OF THE DRAWINGS

FIG. 4A is an exemplary view of a photography image.

FIG. 4B is an exemplary view illustrating extraction of markers of FIG. 4A.

FIG. 7 is an exemplary view illustrating a method of estimating a region in which a surface of a package box is included.

FIG. 8 is an exemplary view illustrating a method of detecting a correspondence relationship between markers.

FIG. 9 is an exemplary view illustrating a method of detecting a correspondence relationship between markers.

FIG. 12 is an exemplary view illustrating an arrangement of package boxes.

FIG. 13 is an exemplary view illustrating an arrangement of package boxes.

FIG. 14A is an exemplary view illustrating an arrangement of package boxes, with a part of a marker being hidden.

FIG. 14B is an exemplary view illustrating a method of estimating the length of a hidden part of the marker of FIG. 1B.

FIG. 16A is an exemplary view illustrating a marker seal.

FIG. 16B is an exemplary view illustrating a marker seal.

FIG. 20A is an exemplary view illustrating a package box on which markers are provided.

FIG. 20B is an exemplary view illustrating the shape of the marker provided on the package box of FIG. 20A.

FIG. 21 is an exemplary view illustrating a method of estimating a side and apices of a package box.

FIG. 22A is an exemplary view illustrating a method of estimating a region in which a surface of a package box is included.

FIG. 22B is an exemplary view illustrating a method of estimating a region in which a surface of a package box is included.

FIG. 23 is an exemplary view illustrating a method of detecting a surface of a package box.

FIG. 24A is an exemplary view illustrating an arrangement of package boxes.

FIG. 26 is an exemplary view illustrating the configuration of a depalletization automating apparatus according to a second embodiment.

DETAILED DESCRIPTION

Figure 1A:
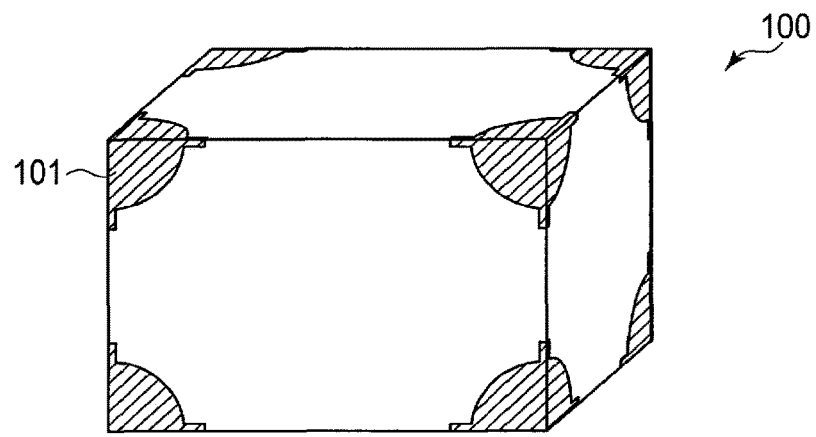
FIG. 1A is an exemplary view illustrating a package box on which markers are provided.

Various embodiments will be described hereinafter with reference to the accompanying drawings.

According to an embodiment, an object detection apparatus includes an imaging unit, an extraction unit, an estimation unit, and a detection unit. The imaging unit acquires an image of a plurality of polyhedrons which are loaded, each of the polyhedrons having a marker on a surface, each of marker including a first straight line portion and a second straight line portion. The extraction unit extracts a plurality of markers included in the image. The estimation unit estimates a region included in the surface by using the first straight line portion and the second straight line portion of the extracted markers. The detection unit detects a region having all corners provided with the markers as a surface of a desired polyhedron.

Incidentally, hereinafter, elements, which are identical or similar to already described elements, are denoted by identical or similar reference numerals, and an overlapping description is basically omitted.

In the description below, a rectangular-parallelepipedic "package box" is used as an example of a "polyhedron". However, aside from this example, other shapes may be used. In addition, although a "package box" is used as an example of an "object", other things, aside from this example, may be used. Furthermore, although a method of detecting markers on a side surface of a package box will be described as a concrete example, the method is not limited to this, and markers on a top surface of the package box may be detected. Besides, a method of providing a marker is not limited to a method of drawing a shape of a marker or a method of attaching a seal having a shape of a marker, and other various methods may be used.

(First Embodiment)

Figure 1B:
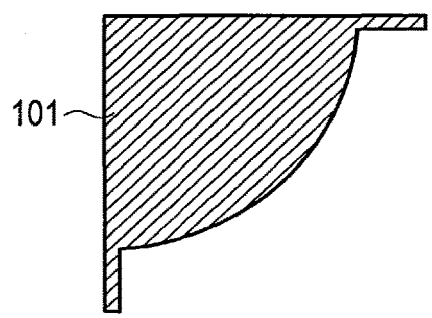
FIG. 1B is an exemplary view illustrating the shape of a marker provided on the package box of FIG. 1A.

An object detection apparatus according to a first embodiment is used in order to detect, for example, a package box 100 illustrated in FIG. 1A. Markers 101 are provided on the four corners of each of the surfaces of the package box 100. As illustrated in FIG. 1B, the marker 101 has a shape including a fan shape with the central angle of 90 degrees. In addition, the marker 101 has two straight lines extending from the central point of the fan shape.

In the package box 100 of FIG. 1A, the central point of the fan shape of the marker 101 matches an apex of the package box 100. In addition, the two straight lines extending from the central point of the fan shape of the marker 101 overlap two neighboring sides which shares the apex of the package box 100.

Figure 2A:
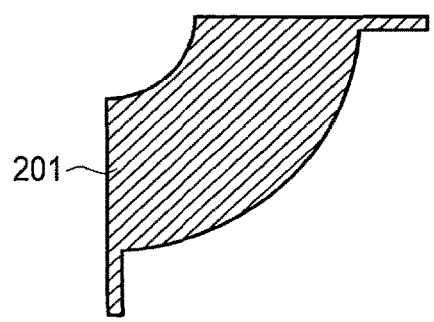
FIG. 2A is an exemplary view illustrating the shape of a marker.
Figure 2B:
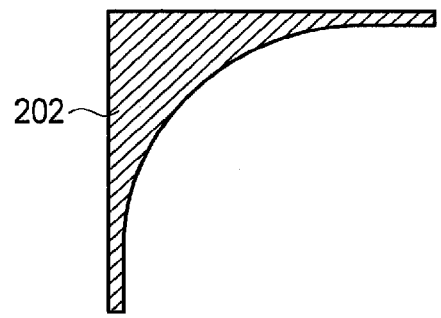
FIG. 2B is an exemplary view illustrating the shape of a marker.

Markers illustrated in FIG. 2A and FIG. 2B may also be used as the markers provided on the four corners of each surface of the package box 100. Unlike the marker 101, a marker 201 illustrated in FIG. 2A is shaped such that the marker 201 does not have a region including the central point of the fan shape. A marker 202 illustrated in FIG. 2B is shaped such that the arc of the fan shape is disposed at a symmetric position with respect to the chord of the fan shape. Specifically, it should suffice if the shape of the marker includes, in a rectangular-parallelepipedic package box, a first straight line portion on a first side including an apex of the box, a second straight line portion on a second side which includes the apex and is different from the first side, and an arc crossing a first point on the first straight line portion and a second point on the second straight line portion, and if the first straight line portion extends beyond the first point and the second straight line portion extends beyond the second point.

Figure 3:
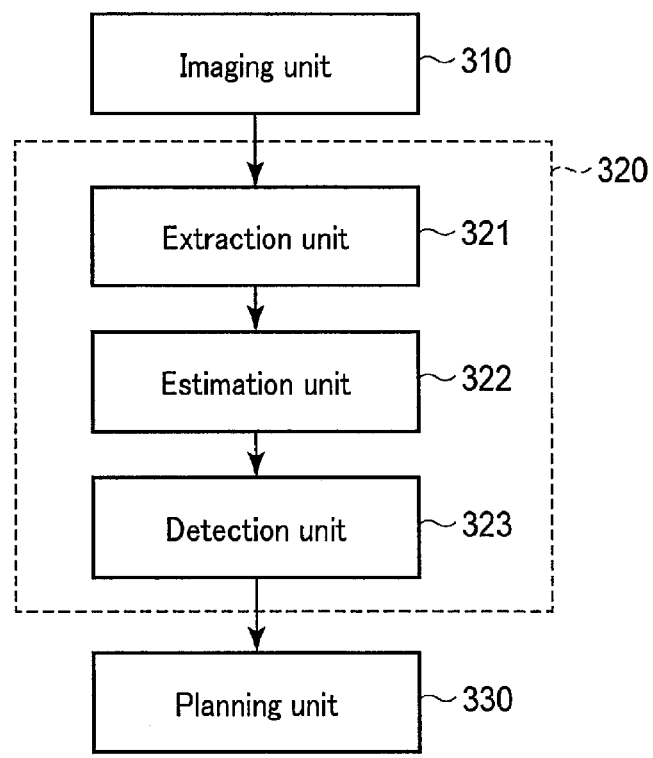
FIG. 3 is an exemplary view illustrating an object detection apparatus according to a first embodiment.

As illustrated in FIG. 3, the object detection apparatus according to the first embodiment includes an imaging unit 310, an image processor 320, and a planning unit 330. The image processor 320 includes an extraction unit 321, an estimation unit 322, and a detection unit 323. The imaging unit 310 corresponds to, for example, a distance image sensor which can also acquire a distance from a photographing position to a package box. The image processor 320 and planning unit 330 correspond to, for example, a computer, and may be individually controlled by a controller (not shown).

The imaging unit 310 acquires a photography image by photographing a plurality of polyhedrons (package boxes) which are loaded, each of the polyhedrons being configured such that markers are provided on all corners of at least a surface, which is to be photographed, of surfaces of the polyhedron (package box), a corner of the surface to be photographed includes a first side extending in a first direction and a second side extending in a second direction crossing the first direction, the marker includes a first straight line portion on the first side, and the marker includes a second straight line portion on the second side. Specifically, the imaging unit 310 acquires a photography image 401 illustrated in FIG. 4A, by photographing side surfaces of the loaded package boxes. The imaging unit 310 outputs the photography image to the extraction unit 321. In the meantime, the imaging unit 310 may acquire distance information which is indicative of a distance from the photographing position to the package box.

The extraction unit 321 receives the photography image from the imaging unit 310. The extraction unit 321 extracts, as extraction data, a plurality of markers included in the photography image. At this time, the extraction unit 321 can extract, as known information, the shapes of the markers provided on the package boxes. In addition, the extraction unit 321 can also adaptively extract a rotated marker and a partially hidden marker. The extraction unit 321 outputs the extraction data to the estimation unit 322. In the meantime, the extraction unit 321 may acquire contour candidates of package boxes, by extracting edges from the photography image. Furthermore, the extraction unit 321 may exclude package boxes, other than the package box to be extracted, by using the distance information which is acquired by the imaging unit 310.

Figure 5A:
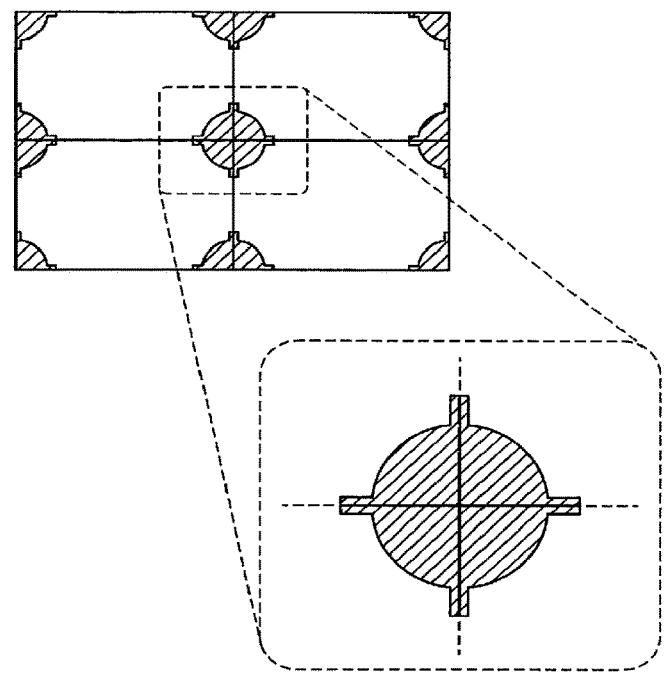
FIG. 5A is an exemplary view illustrating cutout of markers which are in close contact.
Figure 5B:
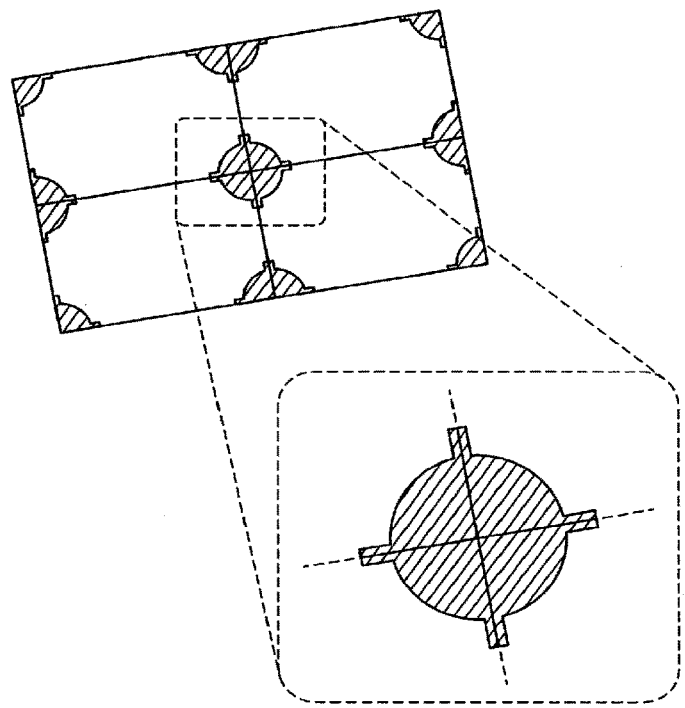
FIG. 5B is an exemplary view illustrating cutout of markers which are in close contact.

Specifically, the extraction unit 321 acquires extraction data 402 illustrated in FIG. 4B, by extracting markers included in the photography image 401 of FIG. 4A. In addition, in a case in which markers are put in close contact, as illustrated in FIG. 5A, the extraction unit 321 can cut out and extract each marker along a broken line in an enlarged view, by utilizing the straight line portions of the markers. Furthermore, even when markers which are put in close contact are inclined, as illustrated in FIG. 5B, the extraction unit 321 can cut out and extract each marker.

The estimation unit 322 receives the extraction data from the extraction unit 321. By using one of the markers included in the extraction data, the estimation unit 322 estimates an intersection point between the first straight line portion and second straight line portion as a point included in the corner of the surface of the polyhedron, and estimates a first straight line and a second straight line corresponding to two sides of the surface of the polyhedron which extend from this point as a starting point and match the first straight line portion and second straight line portion. Then, the estimation unit 322 estimates a region which is defined between the first straight line and second straight line, and in which the surface provided with the marker is included. At this time, the estimation unit 322 may estimate straight lines corresponding to sides of the photographed package box, by further utilizing contour candidates acquired by the extraction unit 321. The estimation unit 322 outputs to the detection unit 323 marker information which is indicative of such information as the apex of the package box estimated by using the marker, the straight lines corresponding to the sides of the package box, and the region in which the surface of the package box is included.

Figure 6A:
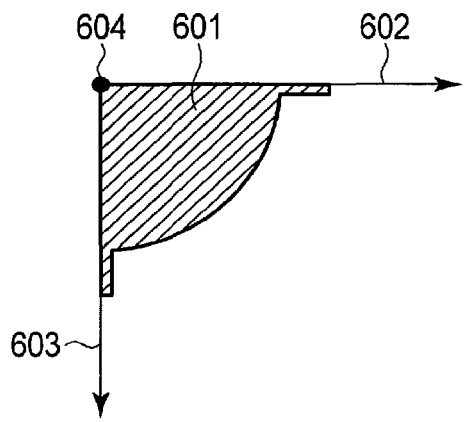
FIG. 6A is an exemplary view illustrating a method of estimating straight lines corresponding to an apex and sides of a surface.

Specifically, as illustrated in FIG. 6A, the estimation unit 322 estimates a straight line 602 and a straight line 603, which are obtained by extending straight line portions of a marker 601, as two straight lines corresponding to two sides that share an apex of the surface of the package box on which the marker 601 is provided. In addition, the estimation unit 322 estimates the central point of the fan shape of the marker 601 as an apex 604 of the package box on which the marker 601 is provided. Alternatively, the estimation unit 322 may estimate an intersection point between the straight line 602 and straight line 603 as the apex 604 of the surface on which the marker 601 is provided. Incidentally, the arrows of the straight line 602 and straight line 603 in FIG. 6A indicate that the sides exist along the directions of the arrows.

Figure 6B:
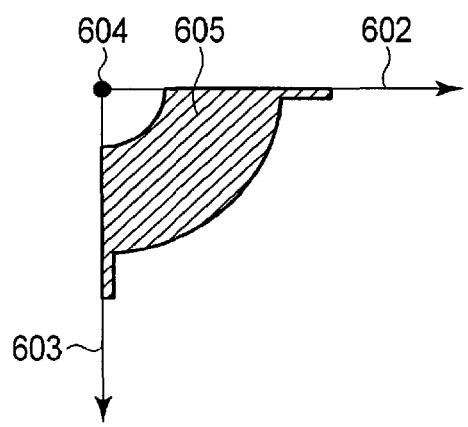
FIG. 6B is an exemplary view illustrating a method of estimating straight lines corresponding to an apex and sides of a surface.

As regards a marker 605 illustrated in FIG. 6B, too, the estimation unit 322 can estimate the apex of the surface of the package box. The marker 605 of FIG. 6B is shaped such that the marker 605 does not have a region including the central point of the fan shape. Alternatively, the marker 605 is extracted in the state in which the region including the central point of the fan shape is missing, due to such an event as crushing of the corner of the package box. The estimation unit 322 estimates the intersection point between the straight line 602 and straight line 603 as the apex 604 of the surface on which the marker 605 is provided.

Furthermore, as illustrated in FIG. 7, the estimation unit 322 estimates a region 704 in which a certain surface of a package box, on which a marker 701 is provided, is included, with a straight line 702 and a straight line 703 of the marker 701 being set as boundary lines.

The detection unit 323 receives the marker information from the estimation unit 322. The detection unit 323 detects, among overlapping regions where regions estimated from a plurality of markers overlap, a region having all corners provided with markers as a surface of a desired package box. Specifically, the detection unit 323 detects each correspondence relationship (such a relationship that markers are included in one surface of an identical package box) between a marker serving as a reference (also referred to as "reference marker" or "first marker") and another marker (also referred to as "other marker", "second marker" or "third marker"), and detects a sum-set of regions, which are formed by these markers, as a surface of a desired package box. The detection unit 323 outputs to the planning unit 330 position information indicative of the positional relationship between the respective detected surfaces of the desired package boxes.

The detection unit 323 may detect the correspondence relationship between the reference marker and the other marker by using a method illustrated in FIG. 8. Here, the other marker is in a mirror-image relationship with the reference marker on the straight line of the reference marker. When a straight line 802 of a reference marker 801 and a straight line 812 of the other marker 811 match, the detection unit 323 detects that the reference marker 801 and the other marker 811 are included in a certain surface of an identical package box.

In addition, as illustrated in FIG. 9, when a straight line 902 of a reference marker 901 matches both a straight line 912 of another marker 911 and a straight line 922 of the other marker 921, the detection unit 323 detects that the reference marker 901 and the another marker 911, which is closest in distance to the reference marker 901, are included in a certain surface of an identical package box.

In other words, the detection unit 323 selects a first marker and a second marker such that a straight line estimated by at least one first marker of extracted markers matches a straight line estimated by at least one second marker which is different from the first marker, the first marker and the second marker are in a mirror-image relationship, and the first marker and the second marker are closest in distance. The detection unit 323 determines that the selected first marker and second marker are two of the markers included in any one of the overlapping regions where regions estimated from the plurality of markers overlap.

Figure 10:
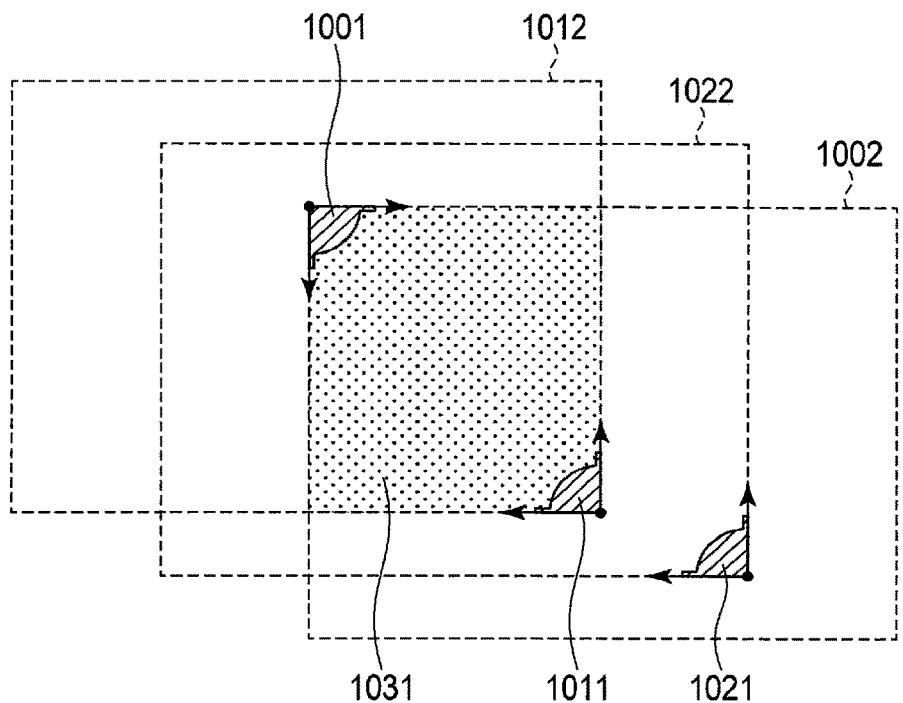
FIG. 10 is an exemplary view illustrating a method of detecting a correspondence relationship between markers.

The detection unit 323 may detect the correspondency relationship between the reference marker and other marker by using a method illustrated in FIG. 10. Here, the other marker has a shape obtained by rotating the shape of the reference marker over 180 degrees. When a region 1002 estimated from a reference marker 1001 overlaps both a region 1012 estimated from another marker 1011 and a region 1022 estimated from the other marker 1021, the detection unit 323 detects that the reference marker 1001 and the another marker 1011, which form a region 1031 with a minimum overlapping area (an overlapping area between the region 1002 and region 1012) exist in a certain surface of an identical package box.

In other words, the detection unit 323 selects a first marker and a third marker such that an area of an overlapping region between regions, which are estimated by at least one first marker of the extracted markers and by at least one third marker which is included in a region corresponding to the first marker and estimated by the estimation unit 322 and has a shape obtained by rotating a shape of the first marker over 180 degrees, becomes smallest, and determines that the selected first marker and the selected third marker are two of the markers included in any one of the overlapping regions.

Figure 11:
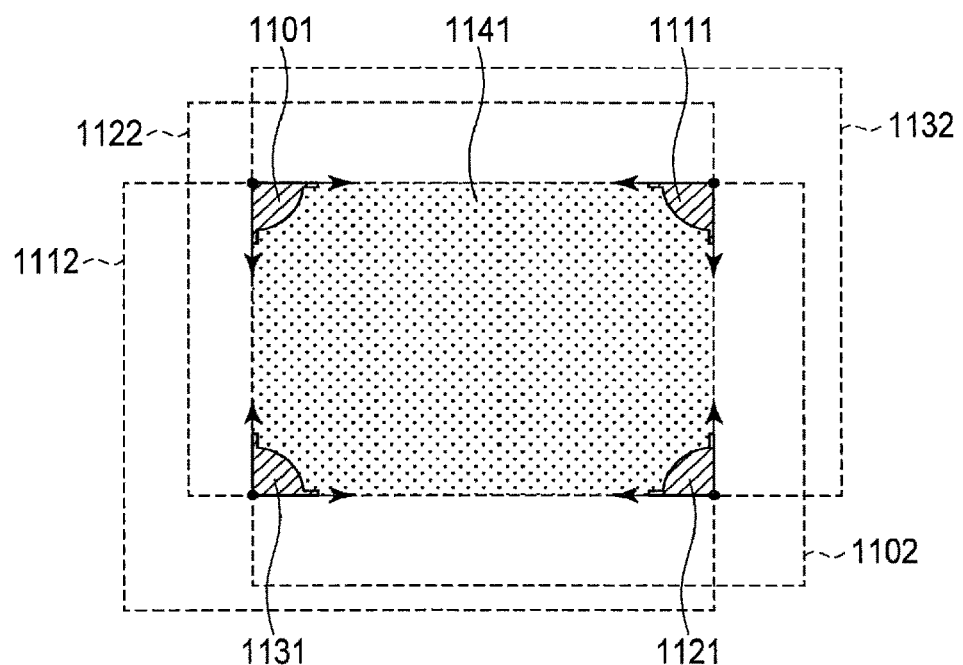
FIG. 11 is an exemplary view illustrating a method of detecting a surface of a package box.

As illustrated in FIG. 11, when a marker 1101, a marker 1111, a marker 1121 and a marker 1131 exist on a certain surface of an identical package box, the detection unit 323 detects an overlapping region 1141 where all of a region 1102, a region 1112, a region 1122 and a region 1132, which are estimated from the respective markers, overlap, as a surface of the desired package box. In the meantime, the detection unit 323 may detect a region where a marker is provided at each of one to three corners, among overlapping regions of the regions estimated from the respective markers, as a region in which a surface of the desired package box may possibly be included. In addition, the detection unit 323 may store, in a memory (not shown), the region in which the surface of the desired package box may possibly be included, and this region may be used in the planning unit 330 (to be described later).

The planning unit 330 receives the position information from the detection unit 323. Based on the position information, the planning unit 330 plans an order of selection for holding package boxes, and an operational procedure for moving package boxes. For example, the planning unit 330 plans such an operational procedure that one package box does not interfere with the other package box.

The object detection apparatus can recognize the front-and-rear positional relationship between package boxes, and can use this front-and-rear positional relationship for the operation plan. For example, as illustrated in FIG. 12, there is a case in which a package box 1211 and a package box 1221 are disposed behind a package box 1201. At this time, the detection unit 323 detects a region in which a surface of the package box 1201 is included, and a region in which a surface of the package box 1211 is included. Since a marker 1202 exists in the inside of the region of the package box 1211, the detection unit 323 detects that the surface of the package box 1201 exists in front of the surface of the package box 1211 (i.e. the surface of the package box 1201 exists frontmost). Accordingly, the planning unit 330 can plan the order of holding, taking into account the front-and-rear relationship of package boxes. For example, the planning unit 330 can make such an operational plan that the package box 1201 is pulled out before the package box 1211 is pulled out.

Here, when the marker 1202 was not detected, the detection unit 323 may detect the front-and-rear relationship of package boxes by using contour candidates (edges) of overlapping regions. In other words, among overlapping regions where regions estimated from markers overlap, if an edge of one region is included in another region, the detection unit 323 detects that the surface of the package box corresponding to the another region is hidden behind the surface of the package box corresponding to the one region.

In addition, as illustrated in FIG. 13, there is a case in which a package box 1310 is disposed behind a package box 1320, and only the markers provided on the package box 1310 are extracted. At this time, the detection unit 323 may detect that a package box is present in front of the package box 1310, since only less than four markers of the package box 1310 were detected. In other words, the detection unit 323 may detect, among overlapping regions where the regions estimated from the respective markers overlap, a region where a marker is provided at each of one to three corners, as a region including a surface of the package box, a part of which is hidden behind a surface of a certain package box. Accordingly, the planning unit 330 can make such an operational plan as pulling out the package box 1310 after raising the package box 1310 up to a position above the top surface of the package box 1320, or pulling out the package box 1310 after moving the package box 1310 in the lateral direction to a position where the package box 1310 does not overlap the package box 1320, or pulling out the package box 1320 before pulling out the package box 1310.

When a part of a marker is hidden, the object detection apparatus can estimate the other part of the marker, and can use this other part for the operational plan. For example, as illustrated in FIG. 14A, there is a case in which a package box 1410 is disposed behind a package box 1420, and a marker 1411, which is a part of a marker provided on the package box 1410, is extracted. At this time, as illustrated in FIG. 14B, the detection unit 323 can estimate a hidden amount (corresponding to a length of a double-headed arrow in FIG. 14B) which indicates how much the package box 1410 is hidden behind the package box 1420.

Specifically, the detection unit 323 finds a circle 1431, which matches an arc portion of the marker 1411, and a central point 1432. The detection unit 323 estimates the other part of the marker, from a straight line corresponding to a hidden side of the package box 1410 at a position where the straight line portion of the marker 1411 is rotated clockwise over 90 degrees. Based on the estimated other part of the marker, the planning unit 330 can plan an efficient operational procedure, for example, such an operational procedure as moving the package box 1410 after shifting the package box 1410 in the lateral direction, or moving package box 1410 after shifting the package box 1410 upward.

Figure 15:
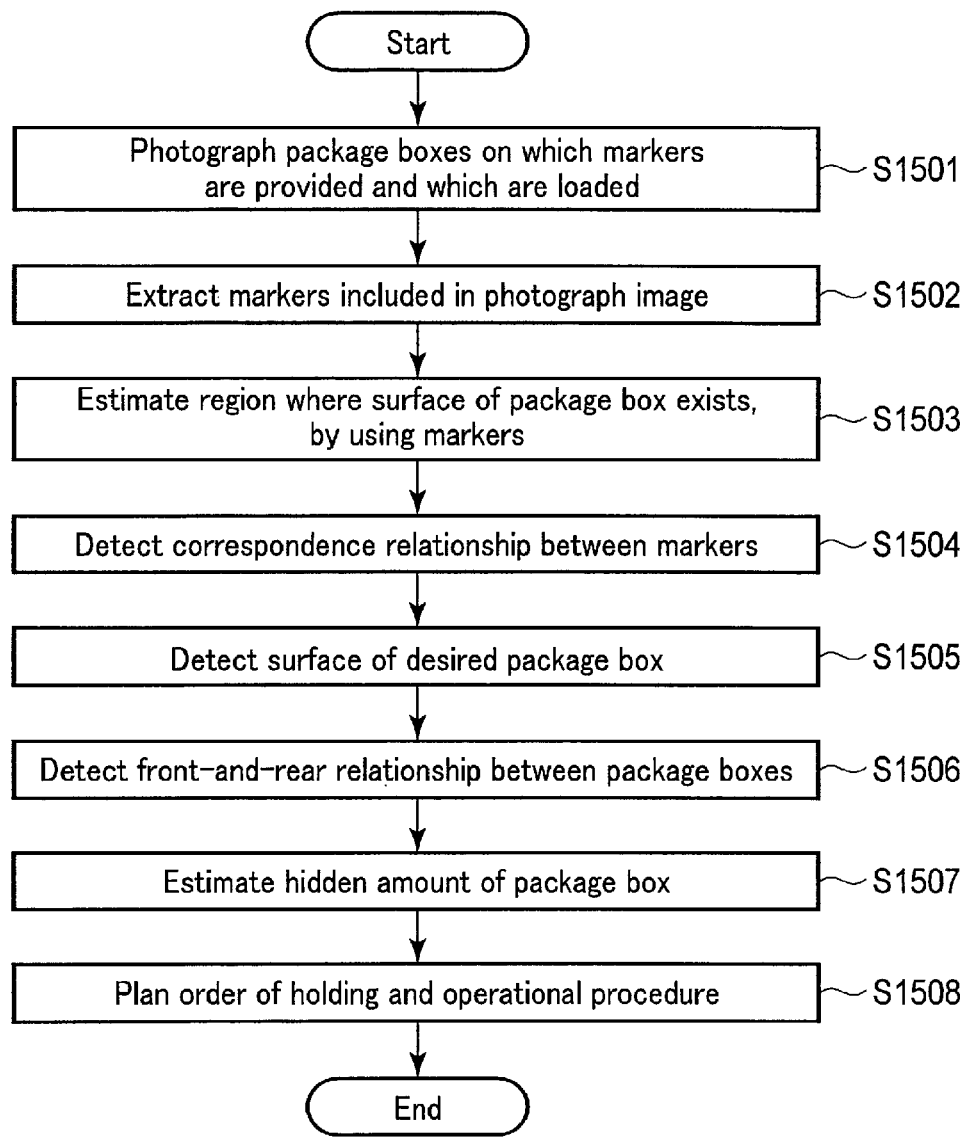
FIG. 15 is an exemplary view illustrating a flowchart of the object detection apparatus of FIG. 3.

The object detection apparatus of FIG. 3 operates as illustrated in FIG. 15. Since concrete examples, etc. of the respective components have been described above, a detailed description thereof is omitted here.

In step S1501, the imaging unit 310 acquires a photography image by photographing package boxes which are provided with markers and are loaded. In the meantime, the imaging unit 310 may acquire distance information indicative of a distance from the photographing point to the package boxes.

In step S1502, the extraction unit 321 extracts markers included in the photography image as extraction data. In the meantime, the extraction unit 321 may acquire contour candidates of package boxes by extracting edges from the photography image. In addition, the extraction unit 321 may exclude package boxes, other than the package box on which markers to be extracted are provided, by using the distance information which is acquired by the imaging unit 310.

In step S1503, the estimation unit 322 estimates a region in which a surface of the package box is included, by using the markers included in the extraction data.

In step S1504, the detection unit 323 detects a correspondency relationship between a reference marker and another marker included in a certain surface of the package box on which the reference marker is provided (i.e. a correspondency relationship between markers).

In step S1505, the detection unit 323 detects, from among overlapping regions where regions estimated from a plurality of markers overlap, a region in which markers are provided at all corners, as a surface of a desired package box.

In step S1506, the detection unit 323 detects a front-and-rear relationship between package boxes.

In step S1507, the detection unit 323 estimates how much one package box is hidden behind the other package box (i.e. a hidden amount of the package box).

In step S1508, the planning unit 330 plans the order of holding and the operational procedure.

The object detection apparatus according to the first embodiment can detect individual package boxes by detecting markers provided on the package boxes. However, when a damage or the like appears on a marker portion, there is concern that the object detection apparatus cannot correctly recognize the marker. As examples in which recognition is not possible, it is thinkable that a package box without markers is used, that a marker portion is smeared, or that a slip is attached to a marker portion. Thus, it is necessary to re-draw (or newly draw) a marker on a package box.

Figure 17:
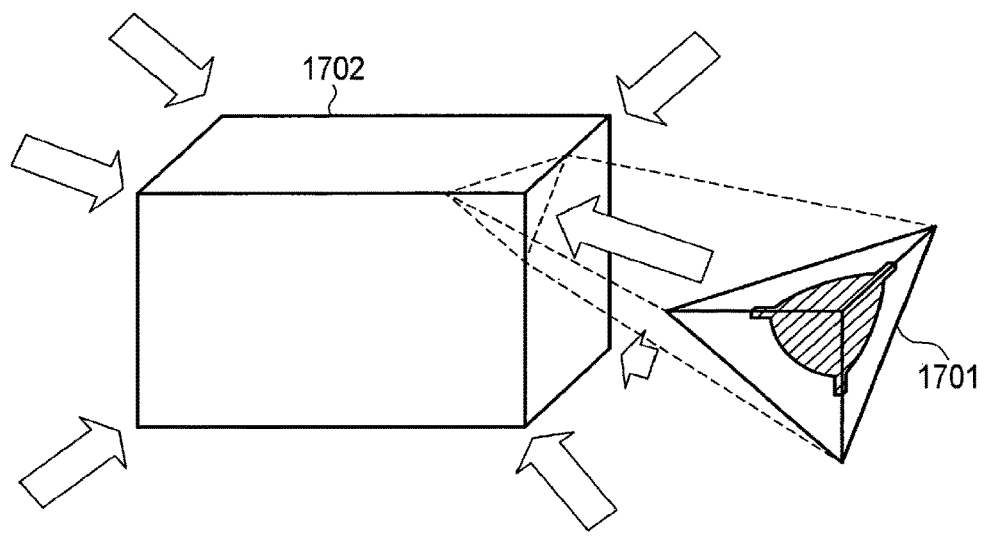
FIG. 17 is an exemplary view illustrating a drawing method of a marker stamp.

As an example of a method of drawing markers on the package box, there is a method in which a seal is attached, or a stamp is pressed. For example, a marker seal 1601 illustrated in FIG. 16A can be attached on a marker, when this marker is damaged. In addition, since a marker seal 1602 illustrated in FIG. 16B is a development of a marker which is provided on a corner of a package box, the marker seal 1602 is suitable for a package box with no markers. A marker stamp 1701 illustrated in FIG. 17 can draw markers by being pressed on each corner of a package box 1702 with no markers.

A colorless, transparent paint, which can be photographed only when light of a specific wavelength is radiated, may be used for the marker provided on the package box. For example, the paint, which is used for the marker, may be a colorless, transparent paint which can be recognized only when ultraviolet is radiated. Such paints are effective in a case in which important information (e.g. a slip) is included at a position where a marker is re-drawn, or in a case in which a beautiful wrapping is applied like a present.

Figure 18:
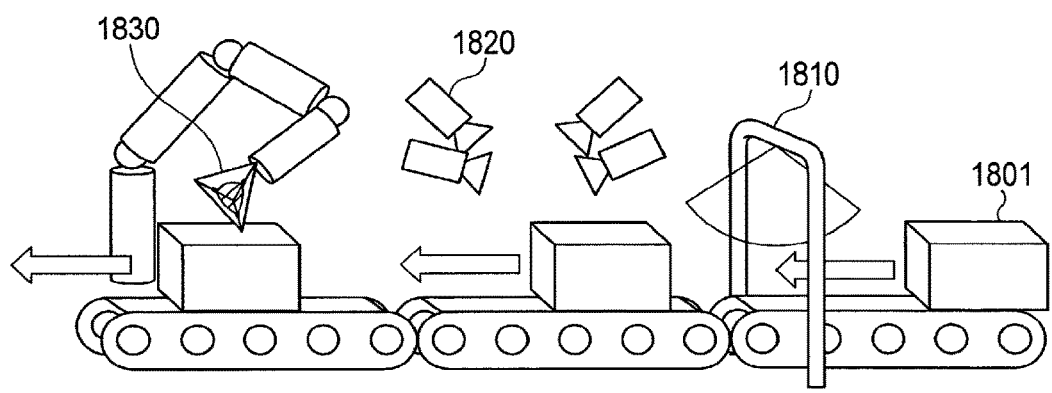
FIG. 18 is an exemplary view illustrating a configuration of a drawing-automating device.

The method of drawing markers on a package box may be automated. A drawing-automating device illustrated in FIG. 18 includes a measuring unit 1810, a collation unit 1820, and a drawing unit 1830. The drawing-automating device can draw markers, for example, on corners of a package box 1801 with no markers. The package box 1801 moves in a direction of arrows in FIG. 18, and markers are drawn on the package box 1801.

The measuring unit 1810 measures the shape of the package box 1801. The collation unit 1820 specifies the positions of apices (corners), based on the measured shape of the package box 1801, acquires images of apex positions by built-in cameras, and collates whether predetermined markers are drawn at the apex positions. The drawing unit 1830 draws, with use of a manipulator, a marker at an apex position of the package box 1801, where the predetermined marker is not drawn. In the meantime, the drawing unit 1830 may use, for example, a linear-motion mechanism, in place of the manipulator.

Figure 19A:
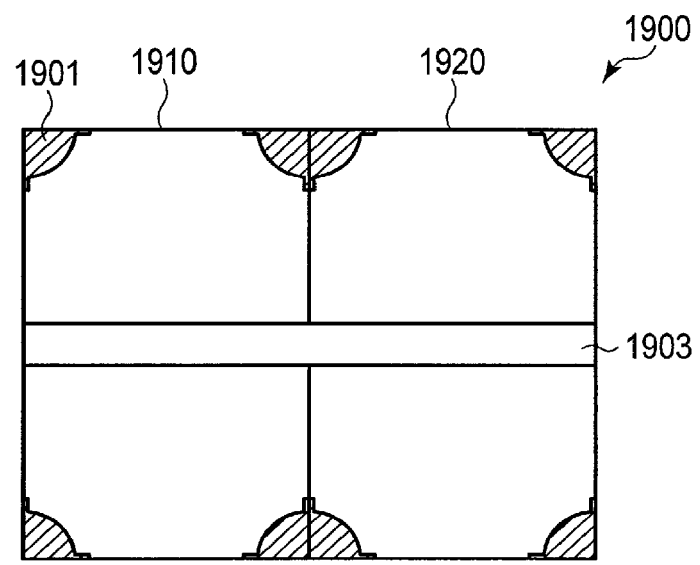
FIG. 19A is an exemplary view illustrating package boxes which are bundled by a band.
Figure 19B:
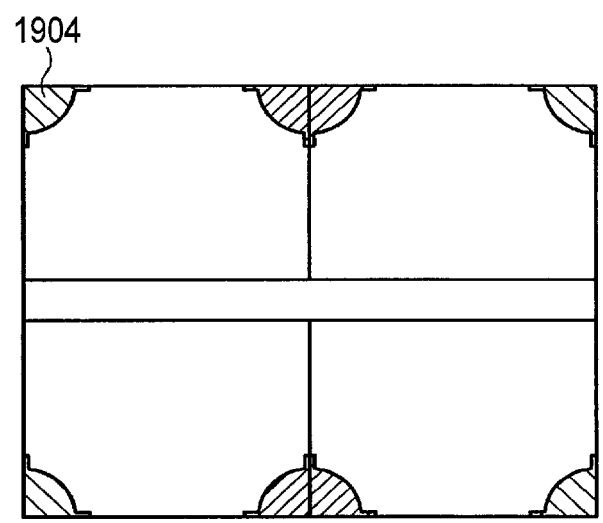
FIG. 19B is an exemplary view illustrating priority markers.

In a pack 1900 illustrated in FIG. 19A, a package box 1910 and a package box 1920 are bundled by a band 1903. At this time, the object detection apparatus detects the package box 1910 and package box 1920 as individual package boxes. In this case, with use of priority markers 1904 illustrated in FIG. 19B, the object detection device can recognize the pack 1900 as a single package box. Specifically, when there exist one marker corresponding to a normal marker, and the other marker which is different from the one marker with respect to at least the color or shape (the above-described priority marker 1904), the detection unit 323 detects the other marker with priority. For example, when the degree of priority, which indicates the order of detection, is set for colors of markers, the detection unit 323 may detect markers according to the degree of priority. Thus, the priority unit 323 can exclude, from objects of detection, normal markers existing in a region estimated by the priority markers 1904. In addition, when an identification code, on which information of a package box is registered, is further provided at least either at a position within a marker or at a position near the marker, the detection unit 323 may detect, with priority, a marker having a greater value of the code. For example, the identification code may be indicative of information such as a date or a time instant.

The object detection apparatus according to the first embodiment may be used in order to detect, for example, a package box 2000 illustrated in FIG. 20A. Markers 2001 are provided on the package box 2000 in a manner to include the four sides of each surface of the package box 2000. As illustrated in FIG. 20B, the marker 2001 has a shape composed of an arc and a chord of a fan shape.

On the package box 2000 of FIG. 20A, the straight line, which forms the chord of the marker 2001, matches the side of the package box 2000. In addition, both ends of the straight line, which forms the chord of the marker 2001, match the two apices of the package box 2000.

The imaging unit 310 acquires a photography image by photographing a plurality of the rectangular parallelepipeds which are loaded, each of the rectangular parallelepipeds being configured such that markers are provided on parts including all sides of at least a surface to be photographed of the surfaces of the rectangular parallelepiped, each of the markers includes the entirety of one side included in each surface, and the markers exist on all sides without overlapping each other.

The extraction unit 321 extracts, as extraction data, a plurality of markers included in the photography image.

By using one of the markers included in the extraction data, the estimation unit 322 estimates that side of the rectangular parallelepiped, which matches the straight line portion of the marker, and estimates a region which includes the estimated side as a boundary and in which the surface provided with the marker is included.

Specifically, as illustrated in FIG. 21, the estimation unit 322 estimates a straight line 2102 of a marker 2101 as a side of a package box on which the marker 2101 is provided. The estimation unit 322 estimates intersection points between the straight line 2102 and the arc of the marker 2101 as two apices (apex 2103 and apex 2104) of the package box on which the marker 2102 is provided.

In addition, as illustrated in FIG. 22A, the estimation unit 322 estimates a region 2203 which includes the estimated side (straight line 2202) as a boundary, and in which the surface of the package box, where a marker 2201 is provided, is included.

Furthermore, as illustrated in FIG. 22B, when two markers (marker 2211 and marker 2221), which share an apex, were detected, the estimation unit 322 estimates a region 2231 which includes estimated sides (straight line 2212 and straight line 2222) as boundary lines, and in which a surface of the package box, where the marker 2211 and marker 2221 are provided, is included.

Among overlapping regions where regions estimated from a plurality of markers overlap, the estimation unit 323 detects a region, where markers are provided on at least two sides, as a surface of a desired rectangular parallelepiped. Specifically, as illustrated in FIG. 23, when at least two markers (marker 2301 and marker 2311) exist on a certain surface of an identical package box, the detection unit 323 detects, as a certain surface of the package box, a region 2321 where a region 2302 and a region 2312 estimated from the respective markers overlap each other.

Based on the positional relationship between the detected surfaces of the desired rectangular parallelepipeds, the planning unit 330 plans an order of selection for holding the rectangular parallelepipeds, and an operational procedure for moving the rectangular parallelepipeds.

Figure 24B:
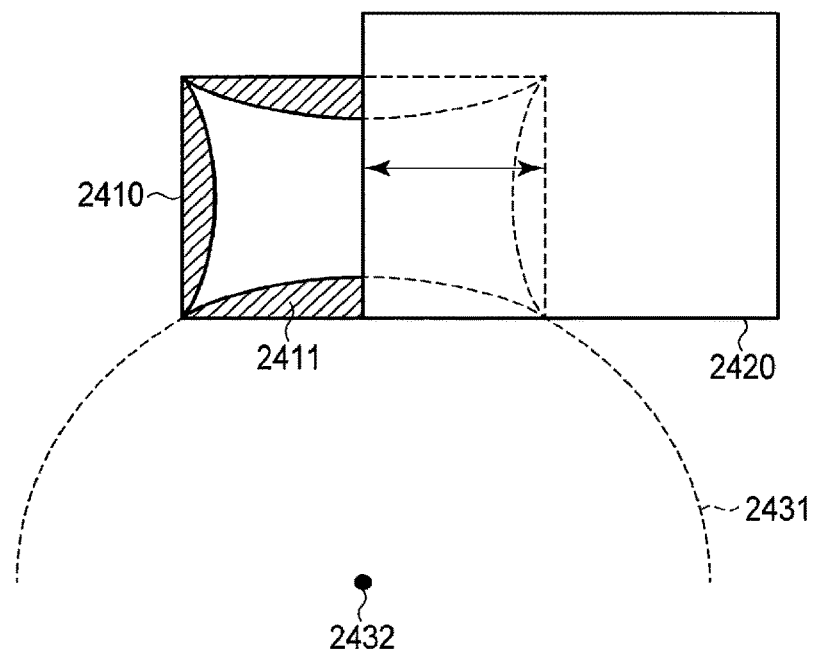
FIG. 24B is an exemplary view illustrating a method of estimating the length of a hidden part of the marker of FIG. 20B.

When a part of a marker is hidden, the object detection apparatus can estimate the other part of the marker, and can use this other part for the operational plan. For example, as illustrated in FIG. 24A, there is a case in which a package box 2410 is disposed behind a package box 2420, and a marker 2411, which is a part of a marker provided on the package box 2410, is extracted. At this time, as illustrated in FIG. 24B, the detection unit 323 can estimate a hidden amount (corresponding to a length of a double-headed arrow in FIG. 24B) which indicates how much the package box 2410 is hidden behind the package box 2420.

Specifically, the detection unit 323 finds a circle 2431, which matches an arc portion of the marker 2411, and a central point 2432. The detection unit 323 extends a straight line portion of the marker 2411, and estimates the other part of the marker, from an intersection point between the straight line portion and the circle 2431. Based on the estimated other part of the marker, the planning unit 330 can plan an efficient operational procedure, for example, such an operational procedure as moving the package box 2410 after shifting the package box 2410 in the lateral direction, or moving package box 2410 after shifting the package box 2410 upward. In the meantime, such estimation cannot be executed with thick-line markers which emphasize the contour of the package box.

As has been described above, the object detection apparatus according to the first embodiment can detect respective loaded package boxes by using the markers provided on the package boxes. In addition, this object detection apparatus can detect the front-and-rear relationship between the package boxes, as viewed from the photographing position. Therefore, this object detection apparatus can detect the object provided with the markers.

Furthermore, by detecting different kinds of markers, this object detection apparatus can increase the degree of priority of detection with respect to an arbitrary package box. Besides, based on the positional relationship between the detected package boxes, this object detection apparatus can plan the order of selection for holding the package boxes, and the operational procedure for moving the package boxes.

(Second Embodiment)

The object detection apparatus according to the above-described first embodiment is applicable to various purposes of use. Specifically, this object detection apparatus may be utilized by a depalletization automating apparatus which can individually detect package boxes which are loaded in a pallet box and are provided with markers, and can automatically performs an unloading operation.

Figure 25:
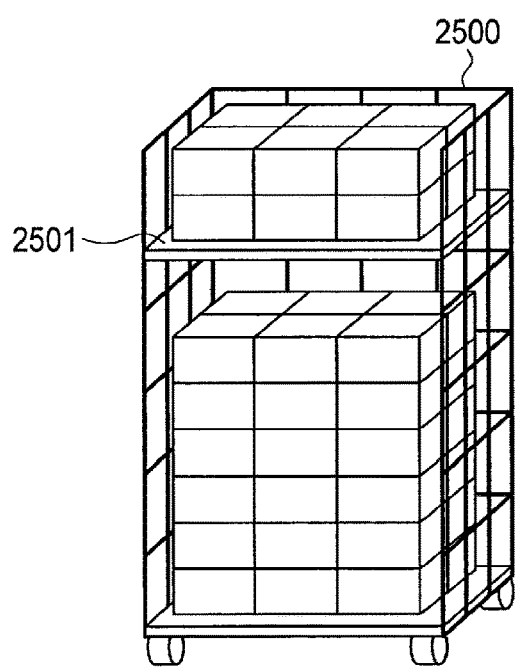
FIG. 25 is an exemplary view illustrating a pallet box.

Package boxes are loaded, for example, in a pallet box 2500 illustrated in FIG. 25. At this time, the loaded package boxes may have uniform sizes or different sizes. The pallet box 2500 is equipped with an intermediate shelf 2501 for facilitating a package sorting work. Although depiction of markers on the package boxes is omitted in FIG. 25, it is assumed that the above-described markers of the first embodiment are provided on all package boxes.

A depalletization automating apparatus according to a second embodiment may photograph, from a predetermined position, package boxes which are loaded, for example, in a pallet box, may individually detect the respective package boxes by extracting markers from the photography image, and may unload the package boxes according to an operational procedure.

Specifically, as illustrated in FIG. 26, the depalletization automating apparatus according to the second embodiment includes a distance image sensor 2610, a controller 2620, an X-directional linear-motion arm 2631, a Y-directional linear-motion arm 2632, a Z-directional linear-motion arm 2633, a suction pad 2641, an end effector 2642, a vacuum pump 2651, an electromagnetic valve 2652, and an air tube 2653. The distance image sensor 2610 may be identical or similar to the imaging unit 310. The controller 2620 includes the image processor 320 and the planning unit 330. Incidentally, the respective components, other than the distance image sensor 2610 and controller 2620, are comprehensively referred to as "acquisition unit". In addition, the X-directional linear-motion arm 2631, Y-directional linear-motion arm 2632 and Z-directional linear-motion arm 2633 are comprehensively referred to as "arm".

The distance image sensor 2610 is disposed so as to face in a take-out direction (frontal direction) of the pallet box 2500 which is fixed at a predetermined position. At this time, the pallet box 2500 is disposed at such a position that the distance image sensor 2610 can photograph the entire lateral width of the pallet box 2500. The distance image sensor 2610 moves in a Z-axis direction, and can thereby photograph the loaded packages. The distance image sensor 2610 can acquire image information within an angle of view, and can acquire, on a pixel-by-pixel basis of the acquired image, distance information to an object which each pixel captures.

The controller 2620 detects surfaces of the respective package boxes, and controls the acquisition unit, based on the order of selection for holding the package boxes and the operational procedure for moving the package boxes. Based on the order and the operational procedure, the acquisition unit picks up the package boxes. Incidentally, a description of the method of detecting the package boxes is omitted here, since this method has been described in connection with the image processor 320 and planning unit 330 in the first embodiment.

The arm can be inserted from the front side of the pallet box 2500, and can move to the front surface or top surface of the package box. In addition, the end effector 2642 including the suction pad 2641, which can hold the package box from the direction of the front surface or top surface of the package box, is attached to one end of the arm.

The suction pad 2641 is connected to the external vacuum pump 2651 via the electromagnetic valve 2652 by the air tube 2653. In addition, by the electromagnetic valve 2652 being opened/closed, the suction pad 2641 holds or releases the package box.

Figure 27:
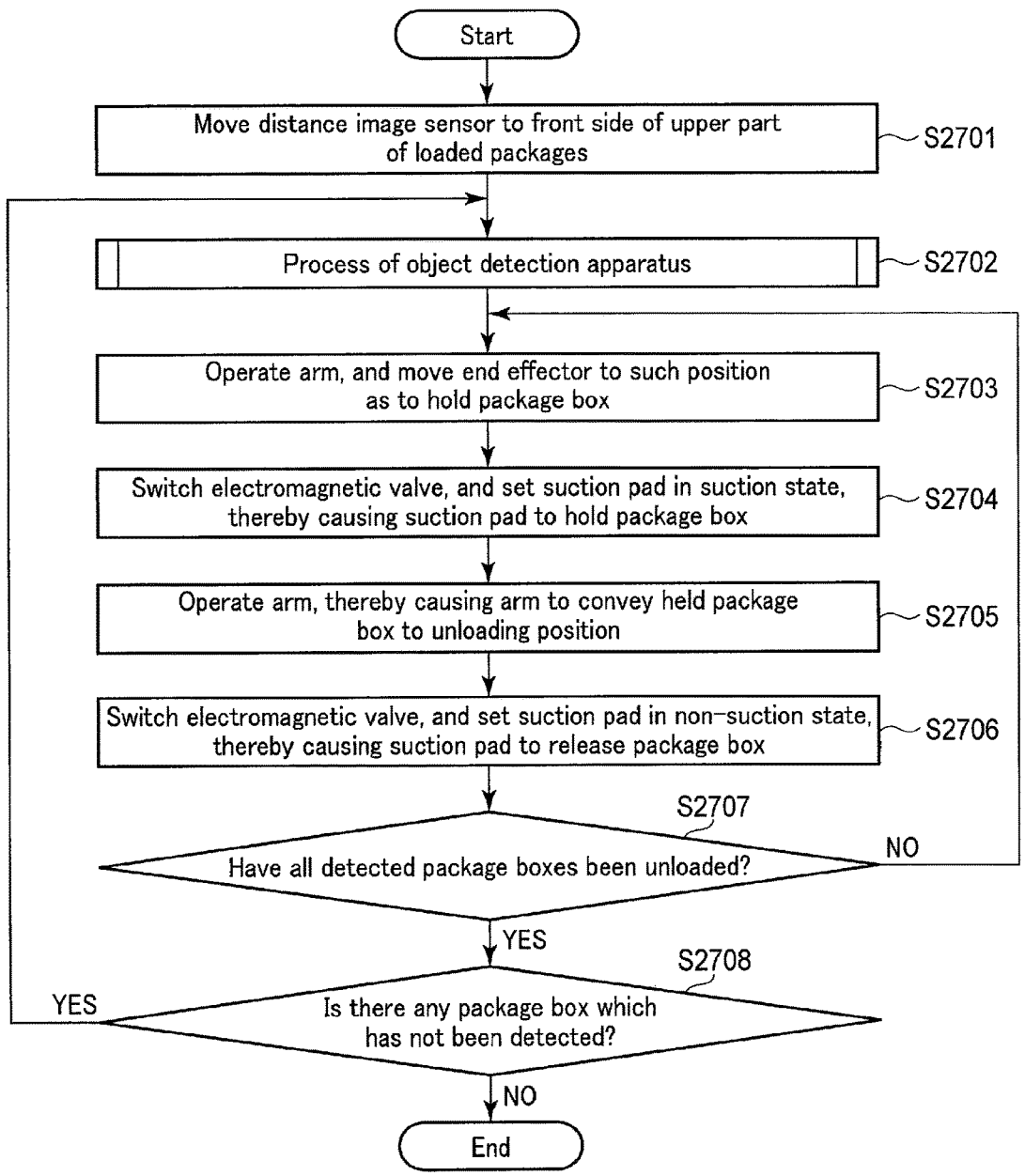
FIG. 27 is a flowchart illustrating an example of the operation of the depalletization automating apparatus of FIG. 26.

The depalletization automating apparatus of FIG. 26 operates as illustrated in FIG. 27.

In step S2701, the controller 2620 moves the distance image sensor 2610 to the front side of the upper part of loaded packages. After step S2701, the process of the object detection apparatus (the flowchart of FIG. 15) is executed.

The details of the process of the object detection apparatus are illustrated in FIG. 15. Since the process of the object detection apparatus has been described above, a detailed description thereof is omitted here. After the process of the object detection apparatus, the process advances to step S2703 of FIG. 27.

In step S2703, the controller 2620 operates the arm, and moves the end effector 2642 to such a position as to hold the package box.

In step S2704, the controller 2620 switches the electromagnetic valve 2652, and sets the suction pad 2641 in a suction state, thereby causing the suction pad 2641 to hold the package box.

In step S2705, the controller 2620 operates the arm, thereby causing the arm to convey the held package box to an unloading position.

In step S2706, the controller 2620 switches the electromagnetic valve 2652, and sets the suction pad 2641 in a non-suction state, thereby causing the suction pad 2641 to release the package box.

In step S2707, the controller 2620 determines whether all the detected package boxes have been unloaded or not. If all the detected package boxes have been unloaded, the process advances to step S2708. If all the detected package boxes have not been unloaded, the process returns to step S2703. In the meantime, in step S2707, after some package boxes were unloaded, the controller 2620 may execute the process of step S2702 once again.

In step S2708, the controller 2620 determines whether there is a package box which has not been detected. If there is a package box which has not been detected, the process returns to step S2702. If there is no package box which has not been detected, the process is terminated.

As has been described above, the depalletization automating apparatus according to the second embodiment includes the object detection apparatus according to the above-described first embodiment. Thus, according to this depalletization automating apparatus, objects, on which markers are provided, can be detected and picked up.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

A variation of an object detection apparatus, and a package box will be additionally described.

(1). An object detection apparatus comprising:
an imaging unit that acquires an image of a plurality of rectangular parallelepipeds which are loaded, each of the rectangular parallelepipeds having a marker provided on a side of a surface, the marker including an entirety of the side, and all markers existing on all sides without overlapping each other;
an extraction unit that extracts a plurality of markers included in the image;
an estimation unit that estimates, by using one of the extracted markers, a side of one rectangular parallelepiped, which matches a straight line portion of one marker, and that estimates a region which includes the estimated side as a boundary and in which the surface provided with the marker is included;
a detection unit that detects, among overlapping regions where a plurality of regions each estimated from the plurality of markers overlap, a region having at least two sides provided with the markers as a surface of a desired rectangular parallelepiped; and
a planning unit that plans an order of selection for holding a plurality of desired rectangular parallelepipeds, and an operational procedure for moving the plurality of desired rectangular parallelepipeds, based on a positional relationship between the detected surfaces of the plurality of desired rectangular parallelepipeds.

(2). A depalletization automating apparatus comprising:
the object detection apparatus of (1); and
an acquisition unit that picks up the desired rectangular parallelepiped, based on the order and the operational procedure.

(3). A package box comprising:
a box configured as a rectangular parallelepiped; and
a marker including a first straight line portion on a first side including an apex of the box, a second straight line portion on a second side including the apex, and an arc crossing a first point on the first straight line portion and a second point on the second straight line portion, the first side being different from the second side, the first straight line portion extends beyond the first point, the second straight line portion extends beyond the second point, wherein
the marker is provided on each of all corners of surfaces of the box.

What is claimed is:
1. An object detection apparatus for detecting respective loaded package boxes by using markers provided on the package boxes, comprising:
a distance image sensor configured to acquire an image including surfaces of loaded polyhedrons, each of the surfaces being a side of a polyhedron and having markers on all corners thereof, each of the markers including a first straight line portion and a second straight line portion; and
processing circuitry configured to
extract a plurality of markers included in the image
estimate regions including each surface by using the first straight line portion and the second straight line portion of each of the extracted markers, and
detect a desired surface based on overlapped regions of the estimated regions,
wherein the processing circuitry is further configured to
estimate, by using at least one of the extracted markers, an intersection point between the first straight line portion and the second straight line portion as a point included in a corner of the surface of one polyhedron, which estimates a first straight line and a second straight line corresponding to two sides of the surface of the one polyhedron which extend from the point, and
match the first straight line portion and the second straight line portion, which estimates a region defined between the first straight line and the second straight line and including the surface provided with the markers,
wherein the processing circuitry is further configured to
select a first marker and a second marker,
determine that the first straight line estimated by at least one first marker of the extracted markers matches the first straight line estimated by another intersection point of at least one second marker which is different from the first marker, such that the first marker and the second marker are in a mirror-image relationship, and the first marker and the second marker are closest in distance, and
determine that the selected first marker and the selected second marker are two of the plurality of markers using an estimation of any one of overlapping regions where a plurality of regions each estimated from the plurality of markers overlap.

2. The apparatus according to claim 1, wherein when a polyhedron is a rectangular parallelepiped, the processing circuitry is configured to
select a first marker and a second marker, and
determine that the selected first marker and the selected second marker are two of the plurality of markers using an estimation of any one of overlapping regions where a plurality of regions each estimated from the plurality of markers overlap, the first marker being at least one of the extracted markers, the second marker being one of the extracted markers which is included in a region estimated by the first marker and has a shape obtained by rotating a shape of the first marker over 180 degrees and forms a smallest overlapping region between regions which are estimated by the first marker and the second marker.

3. The apparatus according to claim 1, wherein when a polyhedron is a rectangular parallelepiped, the processing circuitry is configured to
detect a region where a marker is provided at each of one to three corners, among overlapping regions where a plurality of regions each estimated from the plurality of markers overlap, as a region including a surface of the one polyhedron, a part of which is hidden behind a surface of a certain polyhedron.

4. The apparatus according to claim 1, wherein the processing circuitry is configured to
   extract edges from the image, and
   detect, when an edge of one region is included in another region among overlapping regions where a plurality of regions each estimated from the plurality of markers overlap, that a surface of a polyhedron corresponding to the another region is hidden behind a surface of a polyhedron corresponding to the one region.

5. The apparatus according to claim 1, wherein
   the distance image sensor is further configured to acquire distance information which is indicative of a distance from a photographing position to the loaded polyhedrons, and
   the processing circuitry is configured to detect, based on the distance information, a positional relationship between a surface of the desired polyhedron and a surface of another polyhedron, which is different from the surface of the desired polyhedron.

6. The apparatus according to claim 1, wherein when the processing circuitry extracts another marker which is different from one of the plurality of markers with respect to at least either a color or a shape, the processing circuitry is further configured to
   detect the another marker with priority.

7. The apparatus according to claim 1, wherein when the processing circuitry extracts an identification code that is within a marker or near the marker, on which information of a polyhedron is registered, the processing circuitry is further configured to
   detect the marker having priority over the identification code.

8. The apparatus according to claim 1, wherein the distance image sensor is configured to acquire the image when a specific wavelength is radiated from a colorless and transparent paint used for the marker.

9. The apparatus according to claim 1, wherein the processing circuitry is further configured to
   determine an order of selection for holding a plurality of desired polyhedrons, and
   determine a procedure for moving the plurality of desired polyhedrons, based on a positional relationship between the detected surfaces of the plurality of desired polyhedrons.

10. The apparatus according to claim 9, wherein the processing circuitry is configured to
    determine an operational procedure that one polyhedron does not interfere with another polyhedron.

11. The apparatus according to claim 9, wherein when the processing circuitry extracts only a part of one marker the processing circuitry is further configured to
    estimate the other part of the one marker, and
    determine the operational procedure, based on a size of the other part.

12. A depalletization automating apparatus comprising:
    the apparatus of claim 9; and
    a suction pad configured to pick up the desired polyhedron, based on the order and the operational procedure.

13. An object detection method for detecting respective loaded package boxes by using markers provided on the package boxes, comprising:
    acquiring an image that includes surfaces of polyhedrons which are loaded, each of the surfaces being a side of a polyhedron and having markers on all corners thereof, each of the markers including a first straight line portion and a second straight line portion;
    extracting a plurality of markers included in the image;
    estimating regions including each surface using the first straight line portion and the second straight line portion of the extracted markers;
    detecting a surface of a desired polyhedron based on overlapping regions of the estimated regions;
    estimating, by using at least one of the extracted markers, an intersection point between the first straight line portion and the second straight line portion as a point included in a corner of the surface of one polyhedron, which estimates a first straight line and a second straight line corresponding to two sides of the surface of the one polyhedron which extend from the point;
    matching the first straight line portion and the second straight line portion, which estimates a region defined between the first straight line and the second straight line and including the surface provided with the markers;
    select a first marker and a second marker;
    determine that the first straight line estimated by at least one first marker of the extracted markers matches the first straight line estimated by another intersection point of at least one second marker which is different from the first marker, such that the first marker and the second marker are in a mirror-image relationship, and the first marker and the second marker are closest in distance; and
    determine that the selected first marker and the selected second marker are two of the plurality of markers using an estimation of any one of overlapping regions where a plurality of regions each estimated from the plurality of markers overlap.

* * * * *